United States Patent [19]
Brink et al.

[11] Patent Number: 6,019,900
[45] Date of Patent: Feb. 1, 2000

[54] SINGLE STAGE DENITRIFICATION ANAEROBIC DIGESTION

[75] Inventors: David L. Brink, Berkeley; Ramnik Singh, Albany, both of Calif.

[73] Assignee: The Regents of the University of California, Oakland, Calif.

[21] Appl. No.: 09/128,042

[22] Filed: Aug. 3, 1998

[51] Int. Cl.[7] .................................................. C02F 3/28
[52] U.S. Cl. ........................ 210/603; 210/610; 210/611; 210/903
[58] Field of Search .................... 210/603, 605, 210/610, 611, 631, 903

[56] References Cited

U.S. PATENT DOCUMENTS

| | | |
|---|---|---|
| 3,962,073 | 6/1976 | Yoshikawa et al. ................ 210/631 |
| 4,043,936 | 8/1977 | Francis et al. . |
| 4,415,453 | 11/1983 | Witt et al. . |
| 4,839,052 | 6/1989 | Maree . |
| 5,075,008 | 12/1991 | Chigusa et al. ................... 210/610 |
| 5,100,553 | 3/1992 | Nomura et al. ................... 210/610 |
| 5,143,835 | 9/1992 | Nakatsugawa et al. ........... 210/603 |
| 5,228,998 | 7/1993 | Stover ................................ 210/603 |
| 5,350,516 | 9/1994 | Bhadra ............................... 210/610 |
| 5,618,427 | 4/1997 | Seech et al. ....................... 210/610 |
| 5,876,603 | 3/1999 | Sumino et al. .................... 210/903 |

*Primary Examiner*—Christopher Upton

[57] ABSTRACT

Aqueous waste streams with high chemical oxygen demand and high nitrate levels are treated in a single-stage anaerobic digester by the use of a nutrient mix that includes $NiCl_2$ plus one or more water soluble salts of Fe, Ca, Co, Mo, K, or P, in addition to the denitrifying bacteria and yeast, using pH control and temperature control.

26 Claims, No Drawings

SINGLE STAGE DENITRIFICATION ANAEROBIC DIGESTION

BACKGROUND OF THE INVENTION

Anaerobic digestion is widely used to dispose of a variety of organic waste products in an aqueous waste stream. To employ anaerobic digestion a number of requirements and parameters must be met and/or controlled. In particular, an aqueous waste stream (or feed stream) of organic substances having a significant chemical oxygen demand (COD) or biological oxygen demand (BOD) serves as a substrate for the digestion and is maintained in an anaerobic environment. The substrate is typically digested by a consortium of anaerobic bacteria/microorganisms which reduce the COD and BOD by utilizing the organic substances in metabolic activity involving cell growth and the production of gaseous products.

Conventional anaerobic processing conditions typically include an anoxic environment, controlled acidity/alkalinity, a carbon source, balanced amounts of nutrients supplying nitrogen and phosphorous, and inorganic compounds supplying trace amounts of essential elements. Other parameters which control the metabolism of the microorganisms include a mesophilic temperature range (30–38° C.), a hydraulic retention time (also referred to as a hydraulic detention time) of 7–30 days, a control of acidity in the range of pH 6.5–8.5 with an optimum in the range of pH 6.8–7.2, alkalinity in the range of 1,000 to 5,000 mg/L as $CaCO_3$, controlled mixing to maintain the bacteria in suspension, and maintenance of the microenvironment clear of secreted metabolic products.

One major problem confronted in conventional anaerobic processes is the elimination of nitrate from aqueous systems. Waste streams containing high concentrations of nitrate and nitrite ions are a serious threat to the ecological balances existing in nature. The discharge of conventionally treated waste effluent into the surface waters of lakes and streams often causes accelerated eutrophication of the waters, since these effluents contain quantities of nitrogen and phosphorus which can promote excessive algae production. Aside from being a major nutrient for algae production, nitrogen in the form of ammonia is toxic to aquatic life and can react with chlorine to form chloramines which are toxic to certain fishes. Water for livestock is considered unsafe at nitrate nitrogen concentrations exceeding 10 ppm. These concentrations can cause methemoglopinemia, vitamin A deficiency, loss of milk production, thyroid disturbances and reproductive difficulties. Nitrite wastes are considered to be injurious to several species of fish at concentrations on the order of 5 ppm nitrite nitrogen. Complete denitrification (conversion of nitrate or nitrite to elemental nitrogen gas) prior to releasing wastes to surface waters is thus desirable.

Nitrates that are present at the low levels found in municipal and agricultural wastes can be removed by conventional processing, but this is not sufficient for handling high concentrations of nitrate wastes. Little effort has been directed towards removing nitrates from wasterwater streams in which the nitrate nitrogen concentration exceeds 500 ppm. Fertilizer manufacturing operations are an example of an operation that generates wastewater streams containing nitrates at these levels.

The best technology reported in the literature for the removal of nitrate is the combined nitrification-denitrification single sludge system described by Tchabenoglous, G., and F. L. Benton, *Wastewater Engineering, Treatment, Disposal and Use*, Third Edition, Eliason et al., eds., Metcalf and Edg., Inc., McGraw-Hill, Inc., New York, pp. 714–720 (1991). In this process, different zones are maintained in a conventional aerobic activated sludge digestion. In the aerobic process a high productivity of cell mass takes place, which must then be treated by anaerobic digestion as a means of reducing mass of refractory organic material to be disposed. This process is costly and requires multiple stages.

What is needed in the art is a new method for the anaerobic digestion of aqueous waste streams in which nitrate ion can be efficiently removed in a single stage, batch-fed, continuous digester, eliinating the need for multiple-stage treatment. Surprisingly, the present invention provides such a method.

SUMMARY OF THE INVENTION

It has now been discovered that both chemical oxygen demand and nitrate content in an aqueous waste stream can be reduced to a considerable extent in a single-stage anaerobic reactor by digesting the aqueous stream with a digestion medium that contains denitrifying bacteria, yeast extract, $NiCl_2$, and additional nutrients that consist of one or more water-soluble salts of Fe, Ca, Co, Mo, K, and P. The digestion is performed under anaerobic conditions in either a batch or continuous reactor, with pH control, and preferably temperature control as well. Reduction of chemical oxygen demand by at least about 60%, and in many cases by 70% or more, of its initial level, and reduction of nitrates by at least about 80%, and in many cases by 90% or more, of the initial nitrate level, is achievable by this invention. Nitrites can be eliminated. The invention is applicable for the treatment of aqueous streams having a chemical oxygen demand of 2,000 mg/L or above, or as high as 50,000 mg/L or above, nitrate levels of 500 mg/L or above, or as high as 1,000 mg/L or above (expressed as $NO_3$=ion).

These and other features, aspects and advantages of the invention will be more apparent from the description that follows.

DETAILED DESCRIPTION OF THE INVENTION AND PREFERRED EMBODIMENTS

The present invention arises from the surprising discovery that a consortium of common anaerobic bacteria obtained from commercial digested sludge as a seed can be acclimatized to high concentrations of organic matter in the presence of high concentrations of nitrate ion. A high rate of anaerobic digestion can be maintained, reducing substantially the concentration of organic matter with a simultaneous reduction of nitrate and nitrite ion levels to within the limits established by federal, state and local agencies for disposal.

In view of this discovery, a treatment system has been developed which anaerobically digests organic matter over a broad range of conditions and compositions. The system can be used for, but is not limited to, processing the entire aqueous phase produced by hydrolysis of lignocellulosic materials (LCM), including the soluble monosaccharides, oligomers and degradation products produced from polysaccharides and the phenolic and other solubilized components from the ligneous and extraneous components of the LCM. The hydrolyzate can also be processed to isolate various components or reaction products of the components and the system described herein can be applied to the waste stream from such processing. Additional aqueous waste streams that the system can be applied to are aqueous waste streams from food processing plants, aqueous waste streams from pharmaceutical production processes, effluents and solid waste from farm operations, and high nitrate effluents from chemical process plants.

The digestion medium used in this invention is one that contains denitrifying bacteria, yeast extract, $NiCl_2$ and one or more additional nutrients selected from water-soluble salts of Fe, Ca, Co, Mo, K, Mg, and P. Incubation is performed in an anaerobic environment for a period of time sufficient to achieve a major reduction in both chemical oxygen demand and nitrate level.

The term "anaerobic" as used herein denotes a system which is devoid of molecular oxygen. In contrast, an "aerobic" system is a system in which there is a free supply of molecular oxygen and an "anoxic" system is a system in which there is no molecular oxygen, but where there is a free external supply of nitrates and nitrites and where anaerobic fermentation does not occur.

The bacteria used in the digestion medium according to this invention is a consortium of any of various commonly known denitrifying bacteria or microorganisms. Suitable bacteria or microorganisms for this purpose are those capable of biological denitrification, either from a selected strain, or from a mixed population of microorganisms such as those obtainable from soil or sewage. Particularly useful microorganisms are those that are proliferate in an anaerobic stage at the expense of other microorganisms. Examples of microorganisms suitable for use in this invention are Achromobacter spp., Aerobacter spp., Alcaligenes spp., Bacillus spp., Flavobacterium spp., Micrococcus spp., Proteus spp., and Pseudomonas spp.

The particular yeast extract used is not critical to the invention, and can be any of the wide variety of yeast extracts that are commercially available from chemical suppliers. One such supplier is Sigma Chemical Company, St. Louis, Mo., USA.

The amounts of each nutrient can vary. For best results, the amount of yeast extract used ranges from about 0.01 g/L to about 4 g/L, preferably from about 0.1 to about 0.4 g/L, based on the aqueous waste stream to be treated and the digestion medium combined. The $NiCl_2$ content can also vary, best results generally being obtained with levels ranging from about 0.03 mg/L to about 3 mg/L, preferably about 0.3 to about 0.7 mg/L, of the waste stream and digestion medium combined. Similarly, the amounts of soluble salts can vary, the salts of Fe, Ca, Co, Mo, K and P, producing their best results at concentrations ranging from about 0.03 mg/L to about 3 mg/L each, preferably from about 0.3 to about 0.7 mg/L each. Preferred salts of Fe, Ca, Co, Mo, and Mg are $FeCl_3$, $CaCl_2$, $CoCl_2$, $Na_2MoO_4$, and $MgSO_4$, respectively. The K salt is preferably either KCl or KI. Magnesium sulfate when used is preferably included in an amount ranging from about 2 mg/L to 50 mg/L, preferably about 5 mg/L to about 20 mg/L. One of skill in the art will recognize that many of these salts can be replaced with related soluble salts of the same metals. All of these salts are commercially available from such sources as Aldrich Chemical Company (Milwaukee, Wis., USA). The nutrient mix can contain one or more of these salts in addition to the $NiCl_2$, although at least three, at least four, and in many cases all, of the salts are preferably included.

It is generally desirable to maintain the pH of the digestion medium in an approximately neutral range, preferably pH about 6.0 to about 8.5, more preferably about 6.8 to about 8.0, and most preferably about 6.8 to about 7.3. Control of the pH at the desired level can be achieved by conventional means, including adding alkaline material, such as ammonium hydroxide or sodium hydroxide, and an appropriate buffer such as a phosphate buffer, to the digestion medium. With ammonium hydroxide, the preferred pH range is about 7.3 to about 7.5. The pH of the medium can be measured by intermittently contacting a pH sensor (such as a glass electrode of a conventional pH meter) with the digester effluent and cleaning the liquid-contacting surface of the sensor intermittently to avoid the undesirable build-up of biomass which would interfere with the sensitivity of the sensor to the actual effluent pH. The pH may be measured on the liquid overflow from the settling vessel, prior to any significant loss of $CO_2$ from the liquid overflow.

The digestion of the aqueous waste stream in accordance with this invention is best performed at temperatures and pressures within the range generally conventioanlly used in anaerobic digesters. For example, anaerobic processing usually employs a temperature within the range of about 30° C. to 50° C. Preferred temperatures for this invention are those in the range of about 32° C. to about 40° C., more preferably about 33° C. to about 36° C., and most preferably 34–35° C. Pressure is typically about atmospheric but lower or higher pressures can also be used. A suitable operating range is from about 0.2 atmosphere to about 5 atmospheres.

The digester (i.e., the temperature-controlled vessel in which the reaction occurs) can be operated either in a batchwise or continuous mode, or in any of various combinations such as a continuous operation with batchwise feed. The amount of time that is needed in the digester to produce an effluent with a nitrate level that is about 20% or less of the level initially present in the aqueous waste steam will vary. Likewise, the amount of time needed in the digester to lower the chemical oxygen demand to about 40% or less of the initial level will vary. In most cases, these results will be achieved with a residence time of about 5 days to about 40 days, preferably about 10 days to about 20 days.

The digester can be of relatively small size for laboratory procedures or a large-scale unit for commercial usage. Laboratory-scale digesters can range from a volume of 1–2 liters up to about 22 liters. Commercial-scale units can have volumes of about 1000 liters or greater. The aqueous waste stream to be treated will typically have a chemical oxygen demand of above 2,000 mg/L, although streams with COD above 5000 or 6000 mg/L can also be treated by this invention. The process is particularly suitable for the treatment of waste streams having COD values above 10,000, such as 20,000 to 40,000 mg/L, or even 50,000 mg/L or more. In terms of nitrate content, aqueous waste streams having a nitrate content of above about 500 mg/L, as well as those above about 800 or 1000 mg/L, can be treated. Nitrite contents above about 50 mg/L, as well as those of 100 mg/L or more, can be treated as well.

The process of the present invention can be used for the anaerobic digestion/denitrification of a variety of aqueous waste streams. As noted above, the aqueous waste stream can be an aqueous phase produced by hydrolysis of lignocellulosic materials (LCM), organic waste from a fertilizer production facility, aqueous wastes from a petrochemical plant, a pharmaceutical plant, or a food processing plant. Still other suitable waste streams include effluents and solid organic wastes from animal stockyards and farms, or the runoff and drainage of agricultural lands having high nitrate content.

The following examples are offered for purposes of illustration only.

EXAMPLE 1

This example illustrates the single-stage denitrification and anaerobic digestion of an aqueous waste stream produced by the hydrolysis of lignocellulosic material with dilute nitric acid as a catalytic agent. The soluble monosaccharides content of the stream is listed in Table I and the COD and other chemical characteristics are listed in Table II.

TABLE I

Soluble Monosaccharides Content of Hydrolyzate

|  | Weight Percent | Kilograms | Pounds |
|---|---|---|---|
| Hexoses: |  |  |  |
| Glucose | 0.152 | 0.217 | 0.479 |
| Mannose | 0.100 | 0.143 | 0.316 |
| Galactose | 0.084 | 0.120 | 0.265 |
| Subtotal: | 0.336 | 0.481 | 1.060 |
| Pentoses: |  |  |  |
| Xylose | 0.435 | 0.622 | 1.372 |
| Arabinose | 0.050 | 0.072 | 0.159 |
| Subtotal: | 0.485 | 0.694 | 1.531 |
| Total Sugars | 0.821 | 1.175 | 2.590 |
| Acid Soluble Lignin | 0.288 | 0.412 | 0.909 |

TABLE II

Other Hydrolyzate Characteristics

| Characteristic | Value | Method |
|---|---|---|
| COD (mg/L) | 11,200 |  |
| Nitrate as $NO_3$ (mg/L) | 1,364 | cadmium reduction |
| Nitrite as $NO_3$ (mg/L) | 100 | colorimetric |
| pH | 2.35 | pH meter |
| Total Solids (mg/L) | 5,670 | gravimetric |
| Suspended Solids (mg/L) | 125 | gravimetric |
| Volatile Dissolved Solids (mg/L) | 5,500 | gravimetric |
| Total Dissolved Solids (mg/L) | 5,545 | gravimetric |

Nutrients were added to the hydrolyzate in the amounts shown in Table III. The amounts are shown for three separate experiments, differing only in the ammonium chloride content and the sodium bicarbonate content of the nutrients and the type of base used for pH control. The pH of each hydrolyzate with nutrients added was controlled at 7.2.

TABLE III

Nutrients Added to Hydrolyzate

| Nutrient | Digester A | Digester B | Digester C |
|---|---|---|---|
| $FeCl_3$ (mg/L) | 0.5 | 0.5 | 0.5 |
| $NiCl_2$ (mg/L) | 0.5 | 0.5 | 0.5 |
| $CaCl_2$ (mg/L) | 0.5 | 0.5 | 0.5 |
| $CoCl_2$ (mg/L) | 0.5 | 0.5 | 0.5 |
| $Na_2MoO_4$ (mg/L) | 0.5 | 0.5 | 0.5 |
| KCl (mg/L) | 0.5 | 0.5 | 0.5 |
| $MgSO_4$ (mg/L) | 10 | 10 | 10 |
| Yeast Extract (g/L) | 0.2 | 0.2 | 0.2 |
| $K_2HPO_4$ (g/L) | 3 | 3 | 3 |
| $KH_2PO_4$ (g/L) | 3 | 3 | 3 |
| $NH_4Cl$ (g/L) | 0 | 0.5 | 1.0 |
| $NaHCO_3$ (g/L) | 5.0 | 5.0 | 0.5 |
| pH control | $NH_4OH$ (58%) | $NH_4OH$ (58%) | 10 N NaOH |

The equipment used in each experiment was a digester flask consisting of a 1-liter Erlenmeyer flask immersed in a temperature-controlled water bath maintained at 34.5° C. ±0.5° C., and equipped with a magnetic stirrer bar and a three-hole stopper. One hole of the stopper was occupied by a feed funnel with stopcock. The second hole was occupied by a short length of tubing to permit the passage of gaseous effluent from the flask. The end of the tubing extending above the digester flask was joined to a length of rubber tubing that led to the barrel of a 20-cc airtight plastic syringe inverted with its open end submerged in a 6% sulfuric acid solution saturated with brine. A tee in the rubber tubing upstream of the syringe barrel held a stopcock for use as a gas sampling port. The third hole of the stopper was occupied by a glass tube that extended down toward the bottom of the digester flask to permit the withdrawal of liquid from the flask. The portion of the glass tube above the digester flask was joined to flexible tubing leading to a graduated collection cylinder equipped with a siphoning bulb so that measured amounts of liquid could be drawn from the digester flask.

A starter seed was used to start the digesters. The seed was an active consortium of anaerobic bacteria that had been grown on sewage. The bacteria was obtained from anaerobic digesters of the Environmental Engineering and Health Sciences Laboratory of the University of California Richmond Field Station in Richmond, Calif. The seed was pumped from the bottom of the anaerobic digesters and collected in airtight containers. Collection of the seed was performed on the same day that the seed was used in the experimental Erlenmeyer flask digesters for this experiment.

The seed in each digester was acclimatized by first charging each digester with 1 liter of a 50:50 (by volume) ratio of seed and the sewage that the seed was grown on. After 24 hours, 100 mL of the digester liquid was withdrawn into the liquid collection cylinder by the siphoning bulb, and replaced (through the feed funnel) with 100 mL of a mixture of the hydrolyzate (with nutrient) and fresh sewage, at a ratio of 10:90 (hydrolyzate:sewage by volume). After a further 24 hours, 100 mL was again withdrawn and replaced by 100 mL of a 20:80 mixture of hydrolyzate and sewage. This was continued at 24 hour-intervals with 100 mL replacements using similar increments of increasing hydrolyzate:sewage ratios until on the tenth day the replacement was 100% hydrolyzate. Each day thereafter until the end of the experiment, 100 mL of the digester liquid was replaced with 100 mL of 100% hydrolyzate. The 100 mL amounts were chosen as approximations of a ten-day hydraulic retention time, since ten such replacement amounts would be required to replace the entire 1-liter volume of the digester. All feed volumes were equilibrated to the digester temperature before being added to the digester.

The gaseous effluent was analyzed each day by gas chromatography for carbon dioxide, methane and nitrogen contents. The pH of the withdrawn liquid was likewise determined, and when the gas generation rate, carbon dioxide, methane and nitrogen values reached steady state, the 100-mL volumes of withdrawn liquid were analyzed for chemical oxygen demand (COD), nitrate and nitrite.

COD was measured by use of reagents containing potassium dichromate in a 50% sulfuric acid solution with a silver compound added as a catalyst. The homogenized sample was added to the vial in a volume according to the expected range, and was digested for two hours at 150° C. The vials were then cooled for thirty minutes and COD in mg/L was determined calorimetrically using a DR 2000 spectrophotometer. Nitrate levels were measured by colorimetry using the cadmium reduction method. Nitrite levels were measured by the diazotization method. All of these methods are well known in the art.

The results for the three digesters are shown in Tables IV, V, and VI, respectively. In these tables, "SD" denotes seed, "S" denotes sewage, and "H" denotes hydrolyzate. Using results averaged over the last eight sets of data entries in each table, Digester A achieved a 66% reduction in COD, a 91% reduction in nitrate ion, and a total elimination of nitrite ion; Digester B achieved a 64% reduction in COD, a 91% reduction in nitrate ion, and a total elimination of nitrite ion; and Digester C achieved a 40% reduction in COD, a 90% reduction in nitrate ion, and a total elimination of nitrite ion.

TABLE IV

Example 1 Test Results: Digester A

| | | Gas Analysis | | | | | | | |
|---|---|---|---|---|---|---|---|---|---|
| | Initial Charge or Amount | Volume Generated (mL) | | | | | Liquid Analysis | | |
| Day | Replaced | Daily | Cumulative | $CO_2$ (%) | $N_2$ (%) | $CH_4$ (%) | pH | COD (mg/L) | $NO_3$ (mg/L) | $NO_2$ (mg/L) |
| 0 | 500S + 500SD | | | | | | | | | |
| 1 | 10H + 90S | 50 | 50 | | | | 7.31 | | | |
| 2 | 20H + 80S | 55 | 105 | | | | 7.28 | | | |
| 3 | 33H + 70S | 58 | 163 | | | | 7.24 | | | |
| 4 | 40 + 60S | 52 | 215 | | | | 7.19 | 14110 | 1386 | 100 |
| 5 | 50H + 50S | 50 | 265 | | | | 6.94 | | | |
| 6 | 60H + 40S | 58 | 323 | | | | 6.93 | | | |
| 7 | 70H + 30S | 55 | 378 | | | | 6.93 | | | |
| 8 | 80H + 20S | 55 | 433 | | | | 6.92 | | | |
| 9 | 90H + 10S | 55 | 498 | 26.9 | 55.4 | 12.6 | 6.93 | | | |
| 10 | 100H | 75 | 573 | | | | 6.92 | 6790 | 330 | 40 |
| 11 | 100H | 82 | 655 | 31.6 | 53.9 | 9.2 | 6.91 | | | |
| 12 | 100H | 85 | 740 | | | | 6.87 | | | |
| 13 | 100H | 90 | 830 | 32.3 | 48.5 | 13.1 | 6.76 | | | |
| 14 | 100H | 88 | 918 | 32.4 | 49.0 | 13.6 | 6.86 | | | |
| 15 | 100H | 90 | 1008 | 31.6 | 50.2 | 11.1 | 6.85 | | | |
| 16 | 100H | 100 | 1108 | 34.9 | 50.2 | 11.7 | 6.91 | 5870 | 220 | 0 |
| 17 | 100H | 102 | 1210 | 35.0 | 49.9 | 11.7 | 6.92 | | | |
| 18 | 100H | 108 | 1318 | 37.7 | 47.1 | 13.6 | 6.93 | | | |
| 19 | 100H | 100 | 1418 | 39.0 | 45.3 | 14.0 | 6.93 | | | |
| 20 | 100H | 102 | 1520 | 41.5 | 41.6 | 16.5 | 6.94 | | | |
| 21 | 100H | 105 | 1625 | 42.8 | 37.0 | 17.5 | 7.02 | 4930 | 132 | 0 |
| 22 | 100H | 103 | 1728 | 40.7 | 37.1 | 16.9 | 6.96 | 4900 | 132 | 0 |
| 23 | 100H | 100 | 1828 | 43.2 | 35.4 | 18.8 | 6.94 | 4820 | 110 | 0 |
| 24 | 100H | 105 | 1933 | 46.4 | 38.9 | 19.8 | 6.97 | 4850 | 132 | 0 |
| 25 | 100H | 98 | 2031 | 51.3 | 38.9 | 20.2 | 6.95 | 4780 | 132 | 0 |
| 26 | 100H | 102 | 2133 | 45.5 | 42.7 | 17.3 | 6.96 | 4860 | 110 | 0 |
| 27 | 100H | 100 | 2233 | 47.3 | 38.7 | 19.2 | 6.98 | 4790 | 132 | 0 |
| 28 | 100H | 105 | 2338 | 47.7 | 43.2 | 16.3 | 6.95 | 4890 | 132 | 0 |

TABLE VI

Example 1 Test Results: Digester C

| | | Gas Analysis | | | | | | | |
|---|---|---|---|---|---|---|---|---|---|
| | Initial Charge or Amount | Volume Generated (mL) | | | | | Liquid Analysis | | |
| Day | Replaced | Daily | Cumulative | $CO_2$ (%) | $N_2$ (%) | $CH_4$ (%) | pH | COD (mg/L) | $NO_3$ (mg/L) | $NO_2$ (mg/L) |
| 0 | 500S + 500SD | | | | | | | | | |
| 1 | 10H + 90S | 25 | 25 | | | | 7.30 | | | |
| 2 | 20H + 80S | 25 | 50 | | | | 7.23 | | | |
| 3 | 33H + 70S | 28 | 78 | | | | 7.19 | | | |
| 4 | 40 + 60S | 22 | 100 | | | | 7.11 | 14110 | 1386 | 100 |
| 5 | 50H + 50S | 20 | 120 | | | | 6.89 | | | |
| 6 | 60H + 40S | 22 | 142 | | | | 6.88 | | | |
| 7 | 70H + 30S | 25 | 167 | | | | 6.89 | | | |
| 8 | 80H + 20S | 31 | 198 | | | | 6.88 | | | |
| 9 | 90H + 10S | 42 | 240 | 20.3 | 72.4 | 1.9 | 6.87 | | | |
| 10 | 100H | 50 | 290 | 54.2 | 70.1 | 2.2 | 6.89 | 9220 | 330 | 40 |
| 11 | 100H | 52 | 342 | 19.6 | 69.2 | | 6.88 | | | |
| 12 | 100H | 50 | 392 | | | | 6.88 | | | |
| 13 | 100H | 50 | 442 | 30.4 | 59.4 | 2.5 | 6.85 | | | |
| 14 | 100H | 55 | 497 | 33.3 | 58.2 | 2.6 | 6.70 | | | |
| 15 | 100H | 62 | 559 | | 57.2 | 2.5 | 6.71 | | | |
| 16 | 100H | 65 | 624 | 32.7 | 59.5 | 2.0 | 6.72 | 8950 | 220 | 0 |
| 17 | 100H | 60 | 684 | 34.8 | 58.6 | 5.0 | 6.70 | | | |
| 18 | 100H | 65 | 749 | 36.3 | 51.8 | 9.3 | 6.73 | | | |

TABLE VI-continued

Example 1 Test Results: Digester C

| Day | Initial Charge or Amount Replaced | Volume Generated (mL) Daily | Volume Generated (mL) Cumulative | Gas Analysis CO$_2$ (%) | Gas Analysis N$_2$ (%) | Gas Analysis CH$_4$ (%) | pH | Liquid Analysis COD (mg/L) | Liquid Analysis NO$_3$ (mg/L) | Liquid Analysis NO$_2$ (mg/L) |
|---|---|---|---|---|---|---|---|---|---|---|
| 19 | 100H | 65 | 814 | 35.3 | 49.5 | 13.7 | 6.72 | | | |
| 20 | 100H | 67 | 881 | 36.8 | 45.8 | 16.7 | 6.60 | | | |
| 21 | 100H | 53 | 944 | 36.8 | 37.9 | 16.3 | 6.58 | 8420 | 154 | 0 |
| 22 | 100H | 40 | 984 | 36.5 | 43.1 | 15.4 | 6.50 | 8480 | 154 | 0 |
| 23 | 100H | 38 | 1022 | 36.7 | 44.4 | 16.9 | 6.48 | 8370 | 132 | 0 |
| 24 | 100H | 40 | 1062 | 41.6 | 46.9 | 14.8 | 6.50 | 8450 | 132 | 0 |
| 25 | 100H | 42 | 1104 | 42.5 | 43.3 | 16.1 | 6.51 | 8400 | 132 | 0 |
| 26 | 100H | 40 | 1144 | 43.3 | 47.7 | 15.3 | 6.49 | 8480 | 132 | 0 |
| 27 | 100H | 38 | 1182 | 37.4 | 15.5 | 14.2 | 6.48 | 8540 | 154 | 0 |
| 28 | 100H | 40 | 1222 | 40.7 | 54.1 | 12.8 | 6.48 | 8520 | 132 | 0 |

TABLE VI

Example 1 Test Results: Digester C

| Day | Initial Charge or Amount Replaced | Volume Generated (mL) Daily | Volume Generated (mL) Cumulative | Gas Analysis CO$_2$ (%) | Gas Analysis N$_2$ (%) | Gas Analysis CH$_4$ (%) | pH | Liquid Analysis COD (mg/L) | Liquid Analysis NO$_3$ (mg/L) | Liquid Analysis NO$_2$ (mg/L) |
|---|---|---|---|---|---|---|---|---|---|---|
| 0 | 500S + 500SD | | | | | | | | | |
| 1 | 10H + 90S | 25 | 25 | | | | 7.30 | | | |
| 2 | 20H + 80S | 25 | 50 | | | | 7.23 | | | |
| 3 | 33H + 70S | 28 | 78 | | | | 7.19 | | | |
| 4 | 40 + 60S | 22 | 100 | | | | 7.11 | 14110 | 1386 | 100 |
| 5 | 50H + 50S | 20 | 120 | | | | 6.89 | | | |
| 6 | 60H + 40S | 22 | 142 | | | | 6.88 | | | |
| 7 | 70H + 30S | 25 | 167 | | | | 6.89 | | | |
| 8 | 80H + 20S | 31 | 198 | | | | 6.88 | | | |
| 9 | 90H + 10S | 42 | 240 | 20.3 | 72.4 | 1.9 | 6.87 | | | |
| 10 | 100H | 50 | 290 | 54.2 | 70.1 | 2.2 | 6.89 | 9220 | 330 | 40 |
| 11 | 100H | 52 | 342 | 19.6 | 69.2 | | 6.88 | | | |
| 12 | 100H | 50 | 392 | | | | 6.88 | | | |
| 13 | 100H | 50 | 442 | 30.4 | 59.4 | 2.5 | 6.85 | | | |
| 14 | 100H | 55 | 497 | 33.3 | 58.2 | 2.6 | 6.70 | | | |
| 15 | 100H | 62 | 559 | | 57.2 | 2.5 | 6.71 | | | |
| 16 | 100H | 65 | 624 | 32.7 | 59.5 | 2.0 | 6.72 | 8950 | 220 | 0 |
| 17 | 100H | 60 | 684 | 34.8 | 58.6 | 5.0 | 6.70 | | | |
| 18 | 100H | 65 | 749 | 36.3 | 51.8 | 9.3 | 6.73 | | | |
| 19 | 100H | 65 | 814 | 35.3 | 49.5 | 13.7 | 6.72 | | | |
| 20 | 100H | 67 | 881 | 36.8 | 45.8 | 16.7 | 6.60 | | | |
| 21 | 100H | 53 | 944 | 36.8 | 37.9 | 16.3 | 6.58 | 8420 | 154 | 0 |
| 22 | 100H | 40 | 984 | 36.5 | 43.1 | 15.4 | 6.50 | 8480 | 154 | 0 |
| 23 | 100H | 38 | 1022 | 36.7 | 44.4 | 16.9 | 6.48 | 8370 | 132 | 0 |
| 24 | 100H | 40 | 1062 | 41.6 | 46.9 | 14.8 | 6.50 | 8450 | 132 | 0 |
| 25 | 100H | 42 | 1104 | 42.5 | 43.3 | 16.1 | 6.51 | 8400 | 132 | 0 |
| 26 | 100H | 40 | 1144 | 43.3 | 47.7 | 15.3 | 6.49 | 8480 | 132 | 0 |
| 27 | 100H | 38 | 1182 | 37.4 | 51.5 | 14.2 | 6.48 | 8540 | 154 | 0 |
| 28 | 100H | 40 | 1222 | 40.7 | 54.1 | 12.8 | 6.48 | 8520 | 132 | 0 |

EXAMPLE 2

This example illustrates the results achieved with a higher hydraulic retention time and with variations between continuous and intermittent mixing, all other system parameters being essentially the same as those of Example 1.

Three digesters identical to those described in Example 1 were used. Digesters A and C were run with a ten-day hydraulic retention time as in Example 1, while Digester B was run with a fifteen-day hydraulic retention time (by replacing one-fifteenth of the digester volume each day, rather than one-tenth). Also, Digesters A and B were mixed intermittently for ten minutes every four hours, while Digester C was mixed continuously at a low mixing rate. The same seed and hydrolyzate were used, and the nutrient mix was the same as well except that potassium iodide was used in place of the potassium chloride and ammonium phosphate dibasic at 10 g/L was used in place of the last four salts listed in Table III and also for pH control.

The results for the three digesters are shown in Tables VII, VIII, and IX, respectively. Averaging the test results over the last five days of the test, Digester A achieved a 62% reduction in COD, a 92% reduction in nitrate ion and a 99.7% reduction in nitrite ion; Digester B achieved a 73% reduction in COD, a 92% reduction in nitrate ion and a 99.7% reduction in nitrite ion; and Digester C achieved a 51% reduction in COD, a 91% reduction in nitrate ion and a 99.7% reduction in nitrite ion.

TABLE VII

Example 2 Test Results: Digester A

| | Initial | Gas Analysis | | | | | | Liquid Analysis | | |
|---|---|---|---|---|---|---|---|---|---|---|
| | Charge or Amount | Volume Generated (mL) | | | | | | | | |
| Day | Replaced | Daily | Cumulative | $CO_2$ (%) | $N_2$ (%) | $CH_4$ (%) | pH | COD (mg/L) | $NO_3$ (mg/L) | $NO_2$ (mg/L) |
| 0 | 500S + 500SD | | | | | | | | | |
| 1 | 15H + 60S | 125 | 125 | 15.1 | 57.3 | 27.1 | 7.28 | | | |
| 2 | 30H + 35S | 95 | 220 | 16.1 | 43.7 | 62.4 | 7.19 | | | |
| 3 | 45H + 20S | 118 | 338 | 19.9 | 36.5 | 67.3 | 7.18 | | | |
| 4 | 55 + 10S | 140 | 478 | 23.0 | 30.5 | 53.9 | 7.16 | 11200 | 1364 | 100 |
| 5 | 65S | 160 | 638 | 26.6 | 32.2 | 48.7 | 7.05 | | | |
| 6 | 65S | 152 | 790 | 28.7 | 34.4 | 42.8 | 7.05 | | | |
| 7 | 65S | 140 | 930 | 32.3 | 28.3 | 47.6 | 6.99 | 6540 | 308 | 40 |
| 8 | 65S | 120 | 1050 | 31.3 | 32.2 | 42.8 | 6.98 | | | |
| 9 | 65S | 105 | 1155 | 35.0 | 25.7 | 44.8 | 6.96 | | | |
| 10 | 65H | 103 | 1258 | 37.2 | 27.5 | 43.5 | 6.92 | | | |
| 11 | 65H | 102 | 1360 | 36.4 | 30.1 | 38.6 | 6.90 | | | |
| 12 | 65H | 100 | 1460 | 38.8 | 33.9 | 36.3 | 6.88 | 5620 | 154 | 0.33 |
| 13 | 65H | 100 | 1560 | 38.1 | 37.6 | 31.6 | 6.86 | | | |
| 14 | 65H | 102 | 1662 | 38.1 | 40.1 | 27.9 | 6.86 | | | |
| 15 | 65H | 100 | 1762 | 36.9 | 41.8 | 25.2 | 6.85 | | | |
| 16 | 65H | 103 | 1865 | 37.6 | 43.7 | 24.4 | 6.85 | 4100 | 110 | 0.165 |
| 17 | 65H | 100 | 1965 | 34.2 | 53.0 | 14.3 | 6.84 | 4240 | 110 | 0.165 |
| 18 | 65H | 105 | 2070 | 35.0 | 52.7 | 15.7 | 6.86 | 4420 | 132 | 0.33 |
| 19 | 65H | 100 | 2170 | 34.8 | 54.8 | 15.0 | 6.83 | 4180 | 110 | 0.33 |
| 20 | 65H | 108 | 2278 | | | | 6.85 | 4250 | 110 | 0.165 |

TABLE VIII

Example 2 Test Results: Digester B

| | Initial | Gas Analysis | | | | | | Liquid Analysis | | |
|---|---|---|---|---|---|---|---|---|---|---|
| | Charge or Amount | Volume Generated (mL) | | | | | | | | |
| Day | Replaced | Daily | Cumulative | $CO_2$ (%) | $N_2$ (%) | $CH_4$ (%) | pH | COD (mg/L) | $NO_3$ (mg/L) | $NO_2$ (mg/L) |
| 0 | 500S + 500SD | | | | | | | | | |
| 1 | 15H + 60S | 120 | 120 | 14.8 | 58.1 | 26.5 | 7.30 | | | |
| 2 | 30H + 35S | 90 | 210 | 17.6 | 45.0 | 41.1 | 7.15 | | | |
| 3 | 45H + 20S | 100 | 310 | 19.5 | 36.2 | 47.4 | 7.25 | | | |
| 4 | 55 + 10S | 125 | 435 | 21.8 | 32.6 | 53.0 | 7.21 | 11200 | 1364 | 100 |
| 5 | 65S | 140 | 575 | 25.7 | 26.6 | 56.6 | 7.18 | | | |
| 6 | 65S | 150 | 725 | 27.4 | 23.4 | 55.0 | 7.05 | | | |
| 7 | 65S | 165 | 890 | 30.4 | 18.9 | 58.9 | 7.06 | 5860 | 308 | 40 |
| 8 | 65S | 160 | 1050 | 31.8 | 18.9 | 57.2 | 7.05 | | | |
| 9 | 65S | 150 | 1200 | 31.9 | 16.5 | 57.0 | 7.05 | | | |
| 10 | 65H | 142 | 1342 | 33.6 | 17.9 | 56.5 | 7.04 | | | |
| 11 | 65H | 135 | 1477 | 33.7 | 16.4 | 55.7 | 7.02 | | | |
| 12 | 65H | 115 | 1592 | 35.5 | 17.2 | 56.5 | 6.99 | 4240 | 154 | 0.33 |
| 13 | 65H | 110 | 1702 | 26.8 | 31.8 | 42.1 | 6.97 | | | |
| 14 | 65H | 105 | 1807 | 33.0 | 29.2 | 43.7 | 6.97 | | | |
| 15 | 65H | 102 | 1909 | 33.3 | 30.1 | 40.7 | 6.95 | | | |
| 16 | 65H | 100 | 2009 | 23.9 | 31.2 | 40.1 | 6.95 | 2960 | 110 | 0.165 |
| 17 | 65H | 97 | 2106 | 34.1 | 35.0 | 35.0 | 6.93 | 2874 | 88 | 0.33 |
| 18 | 65H | 95 | 2201 | 35.0 | 34.7 | 35.0 | 6.93 | 2980 | 110 | 0.165 |
| 19 | 65H | 100 | 2301 | 35.5 | 37.9 | 32.0 | 6.95 | 3090 | 110 | 0 |
| 20 | 65H | 103 | 2404 | | | | 6.94 | 3010 | 110 | 0 |

TABLE IX

Example 2 Test Results: Digester C

| | Initial Charge or Amount | Gas Analysis | | | | | Liquid Analysis | | |
|---|---|---|---|---|---|---|---|---|---|
| | | Volume Generated (mL) | | | | | | | |
| Day | Replaced | Daily | Cumulative | CO$_2$ (%) | N$_2$ (%) | CH$_4$ (%) | pH | COD (mg/L) | NO$_3$ (mg/L) | NO$_2$ (mg/L) |
| 0 | 500S + 500SD | | | | | | | | | |
| 1 | 15H + 60S | 120 | 120 | 15.7 | 52.7 | 32.5 | 7.24 | | | |
| 2 | 30H + 35S | 92 | 212 | 16.8 | 47.6 | 49.7 | 7.02 | | | |
| 3 | 45H + 20S | 113 | 325 | 19.5 | 38.3 | 45.6 | 7.12 | | | |
| 4 | 55 + 10S | 135 | 460 | 22.1 | 33.9 | 49.9 | 7.12 | 11200 | 1364 | 100 |
| 5 | 65S | 130 | 590 | 25.1 | 31.9 | 51.4 | 7.03 | | | |
| 6 | 65S | 125 | 715 | 30.4 | 24.8 | 50.6 | 7.02 | | | |
| 7 | 65S | 95 | 810 | 31.2 | 27.2 | 49.8 | 6.98 | 6720 | 330 | 40 |
| 8 | 65S | 80 | 890 | 31.9 | 30.6 | 43.8 | 6.96 | | | |
| 9 | 65S | 82 | 972 | 33.7 | 31.1 | 40.0 | 6.94 | | | |
| 10 | 65H | 85 | 1057 | 35.0 | 34.0 | 38.1 | 6.89 | | | |
| 11 | 65H | 85 | 1142 | 35.8 | 33.8 | 35.6 | 6.85 | | | |
| 12 | 65H | 83 | 1225 | 37.4 | 37.6 | 33.2 | 6.82 | 5880 | 176 | 0.33 |
| 13 | 65H | 85 | 1310 | 37.1 | 40.8 | 28.3 | 6.82 | | | |
| 14 | 65H | 85 | 1395 | 36.0 | 43.5 | 24.2 | 6.82 | | | |
| 15 | 65H | 80 | 1475 | 33.3 | 43.4 | 24.0 | 6.82 | | | |
| 16 | 65H | 82 | 1557 | 35.1 | 45.3 | 21.5 | 6.82 | 4370 | 132 | 0.33 |
| 17 | 65H | 82 | 1639 | 37.9 | 49.1 | 16.8 | 6.81 | 4530 | 132 | 0.165 |
| 18 | 65H | 80 | 1719 | 37.3 | 57.0 | 11.0 | 6.80 | 4720 | 132 | 0.33 |
| 19 | 65H | 80 | 1799 | 32.1 | 57.4 | 11.2 | 6.80 | 4410 | 132 | 0.495 |
| 20 | 65H | 103 | 1902 | | | | 6.94 | 4590 | 110 | 0.165 |

EXAMPLE 3

This example presents test results using a fermentate obtained by yeast fermentation of a concentrated lignocellulosic material hydrolyzate.

The hydrolyzate, which originally contained 1.054% total sugars, was concentrated twenty times by flash evaporation, then filtered using Whatman No. 1 filter paper. It was then passed through a resin column and diluted to approximately 15% total sugars, then fermented with *Saccharomyces cerevisae* yeast for 96 hours. The resulting fermentate (2.0 liters) was combined with a second fermentate (0.5 liter) from fermentation of a similar hydrolyzate using *Pichia stipitis* yeast. The nutrient mix was identical to that of Example 2, except that the quantity of ammonium phosphate dibasic was 50 g/L, and 10 mL of ammonium hydroxide (58%) was included.

The same equipment used in Examples 1 and 2 was used and similar procedures were followed for the digestion. Two digesters were used, and the hydraulic retention times were varied between 15 days, 20 days and 40 days through the two runs (by withdrawing and replacing one-fifteenth, one-twentieth, and one-fortieth of the digester volume each day, respectively). After several days at a hydraulic retention time of 40 days, the fermentate was diluted 1:5 with tap water before being fed to the digesters and the retention time was lowered to 20 days to improve the efficiency of the process. Also, after a few days of run time with the whole fermentate, the fermentate was distilled under vacuum prior to use to remove ethanol. Control of pH was achieved by slug additions of ammonium chloride, ammonium hydroxide (58%), peptone and yeast extracts.

The results for Digesters A and B are shown in Tables X and XI, where the following abbreviations (in addition to those mentioned above) are used: "Fw": fermentation undistilled; "Fw/o": fermentate distilled to remove ethanol; "AH": ammonium hydroxide; "AC": ammonium chloride; "YE": yeast extract. Both tables show a substantial reduction in COD and nitrate ion and a total elimination of nitrite ion.

TABLE X

Example 3 Test Results: Digester A

| Day | Initial Charge or Amount Replaced | pH Adjustment | Gas Analysis | | | | | Liquid Analysis | | |
|---|---|---|---|---|---|---|---|---|---|---|
| | | | Volume Generated Over 24 Hours (mL) | CO$_2$ (%) | N$_2$ (%) | CH$_4$ (%) | pH | COD (mg/L) | NO$_3$ (mg/L) | NO$_2$ (mg/L) |
| 0 | 500S + 500SD | | | | | | | | | |
| 1 | 17Fw + 52S | | 138 | 12.3 | 62.6 | 18.9 | 7.25 | 127150 | 4070 | 250 |
| 2 | 30Fw + 37S | | 325 | 25.6 | 36.3 | 43.5 | 7.02 | | | |
| 3 | 42Fw + 25S | | 550 | 50.8 | 13.7 | 40.1 | 7.11 | 138700 | 3630 | 250 |
| 4 | 67Fw | 0.2 g pep. | 610 | 42.3 | 11.3 | 51.6 | 6.68 | | | |
| 5 | 67Fw | 1 mL AH | 650 | 76.6 | 11.6 | 10.7 | 6.46 | | | |
| 6 | 67Fw | 0.1 g AC | 770 | 74.9 | 16.4 | 9.2 | 6.48 | | | |

TABLE X-continued

Example 3 Test Results: Digester A

| | | | Gas Analysis | | | | | Liquid Analysis | | |
|---|---|---|---|---|---|---|---|---|---|---|
| Day | Initial Charge or Amount Replaced | pH Adjustment | Volume Generated Over 24 Hours (mL) | CO$_2$ (%) | N$_2$ (%) | CH$_4$ (%) | pH | COD (mg/L) | NO$_3$ (mg/L) | NO$_2$ (mg/L) |
| 7 | 67Fw | 3.1 mL AH | 500 | 80.6 | 13.8 | 5.0 | 6.29 | 46160 | 660 | 200 |
| 8 | 67Fw | 2.0 mL AH | 375 | 63.3 | 26.9 | 8.1 | 6.58 | | | |
| 9 | No feed | | 325 | 79.1 | 17.1 | 4.1 | 6.62 | | | |
| 10 | 20S + 45SD | | 20 | | | | 6.78 | | | |
| 11 | 20S + 45SD | | 65 | 57.3 | 37.1 | 10.9 | 6.91 | 31080 | 308 | 200 |
| 12 | 2bFw | | 50 | 54.0 | 41.0 | 12.0 | 7.04 | | | |
| 13 | 25Fw | | 200 | 56.7 | 35.2 | 12.0 | 7.03 | | | |
| 14 | 2SFw/o | | 275 | 70.4 | 17.4 | 13.5 | 6.92 | 28520 | 308 | 200 |
| 15 | 25Fw/o | 1.0 mL AH | 375 | 77.8 | 12.3 | 14.5 | 6.93 | | | |
| 16 | 25Fw/o | 0.2 g AC | 310 | 69.6 | 13.2 | 22.9 | 6.92 | | | |
| 17 | 25Fw/o | 2.0 mL AH | 250 | 73.2 | 10.5 | 19.9 | 6.89 | | | |
| 18 | 25Fw/o | 0.5 g pep + AC | 130 | 55.1 | 24.0 | 21.8 | 7.03 | | | |
| 19 | 25Fw/o | | 150 | 62.1 | 13.1 | 30.1 | 7.02 | 29940 | 264 | 200 |
| 20 | 50Fw/o (1:5 dil.) | | 200 | 60.7 | 13.3 | 29.3 | 6.89 | | | |
| 21 | 50Fw/o (1:5 dil.) | | 180 | 50.0 | 20.9 | 32.0 | 7.02 | | | |
| 22 | No feed | | 170 | 57.1 | 10.8 | 34.9 | 6.83 | | | |
| 23 | 50Fw/o (1:5 dil.) | 0.5 g YE | 15 | | | | 6.85 | | | |
| 24 | 50Fw/o (1:5 dil.) | | 150 | 37.7 | 29.0 | 42.3 | 6.93 | | | |
| 25 | 50Fw/o (1:5 dil.) | | 140 | 40.8 | 24.7 | 40.5 | 6.94 | 19400 | 220 | 0 |
| 26 | 50Fw/o (1:5 dil.) | 2 mL AH + 0.5 g YE | 130 | 49.8 | 23.3 | 43.3 | 6.90 | 18900 | 220 | 0 |
| 27 | 50Fw/o (1:5 dil.) | | 125 | 23.9 | 36.1 | 45.8 | 7.26 | 18500 | | |
| 28 | 50Fw/o (1:5 dil.) | 1 mL AH | 130 | | | | 6.98 | 17700 | | |
| 29 | No feed | | | | | | | | | |
| 30 | No feed | | | | | | | | | |
| 31 | 50Fw/o (1:5 dil.) | | 200 | 35.5 | 23.9 | 46.1 | 7.31 | 17040 | | |
| 32 | 50Fw/o (1:5 dil.) | | 75 | 26.2 | 27.2 | 58.0 | 7.24 | 16540 | 176 | 0 |
| 33 | 50Fw/o (1:5 dil.) | | 115 | 31.3 | 21.7 | 56.6 | 7.28 | 14860 | | |
| 34 | 50Fw/o (1:5 dil.) | 1.0 mL AH | 125 | 36.7 | 15.5 | 55.1 | 7.24 | | | |
| 35 | 50Fw/o (1:5 dil.) | 0.5 mL AH | 120 | 36.2 | 12.1 | 60.3 | 6.97 | | | |
| 36 | 50Fw/o (1:5 dil.) | 0.5 g AC | 115 | 42.2 | 8.0 | 55.1 | 6.99 | 12240 | 132 | 0 |
| 37 | 50Fw/o (1:5 dil.) | 0.5 mL AH | 120 | 30.2 | 20.0 | 55.1 | 7.05 | | | |
| 38 | 50Fw/o (1:5 dil.) | | 110 | 29.5 | 23.9 | 55.2 | 7.25 | 10670 | 132 | 0 |
| 39 | No feed | 0.25 g YE + 10 mL SD | 125 | 35.1 | 17.6 | 56.5 | 6.98 | | | |
| 40 | 50Fw/o (1:5 dil.) | 1.0 mL AH | 20 | | | | 7.03 | | | |
| 41 | 50Fw/o (1:5 dil.) | 0.75 mL AH | 125 | 28.1 | 49.2 | 27.4 | 7.18 | 9860 | 88 | 0 |
| 42 | 50Fw/o (1:5 dil.) | 1.0 mL AH | 122 | 26.9 | 45.2 | 39.1 | 7.18 | | | |
| 43 | 50Fw/o (1:5 dil.) | | 155 | 19.5 | 42.0 | 43.6 | 7.41 | 9220 | 110 | 0 |
| 44 | 50Fw/o (1:5 dil.) | 0.5 mL AH | 128 | 27.2 | 35.2 | 44.2 | 7.23 | 9880 | 88 | 0 |
| 45 | 50Fw/o (1:5 dil.) | 0.5 mL AH | 122 | 24.8 | 34.3 | 45.4 | 7.19 | | | |
| 46 | 50Fw/o (1:5 dil.) | 0.5 mL AH | 120 | 24.2 | 36.7 | 45.2 | 7.23 | 9840 | 88 | 0 |
| 47 | 50Fw/o (1:5 dil.) | 0.5 mL AH | 130 | 24.7 | 35.8 | 44.6 | 7.22 | | | |
| 48 | 50Fw/o (1:5 dil.) | 0.5 mL AH | 118 | 25.6 | 38.8 | 44.5 | 7.21 | | | |
| 49 | 50Fw/o (1:5 dil.) | 0.5 mL AH | 120 | 24.9 | 36.3 | 45.6 | 7.23 | 9780 | 88 | 0 |
| 50 | 50Fw/o (1:5 dil.) | 0.5 mL AH | 116 | 25.7 | 36.8 | 46.4 | 7.22 | | | |
| 51 | 50Fw/o (1:5 dil.) | 0.5 mL AH | 118 | 24.7 | 35.2 | 46.7 | 7.24 | 9820 | 88 | 0 |
| 52 | 50Fw/o (1:5 dil.) | 0.5 mL AH | 115 | 25.1 | 35.5 | 44.8 | 7.25 | | | |
| 53 | 50Fw/o (1:5 dil.) | 0.5 mL AH | 117 | 24.3 | 37.1 | 45.4 | 7.24 | 9860 | 88 | 0 |
| 54 | 50Fw/o (1:5 dil.) | 0.5 mL AH | 120 | 23.4 | 36.0 | 44.8 | 7.24 | | | |
| 55 | 50Fw/o (1:5 dil.) | 0.5 mL AH | 118 | | | | 7.23 | | | |
| 56 | No feed | | 114 | | | | 7.25 | | | |

TABLE XI

Example 3 Test Results: Digester B

| | | | Gas Analysis | | | | | Liquid Analysis | | |
|---|---|---|---|---|---|---|---|---|---|---|
| Day | Initial Charge or Amount Replaced | pH Adjustment | Volume Generated Over 24 Hours (mL) | CO$_2$ (%) | N$_2$ (%) | CH$_4$ (%) | pH | COD (mg/L) | NO$_3$ (mg/L) | NO$_2$ (mg/L) |
| 0 | 500S + 500SD | | | | | | | | | |
| 1 | 10Fw + 40S | | 130 | 16.7 | 55.0 | 25.4 | 7.26 | 127150 | 4070 | 250 |
| 2 | 20Fw + 30S | | 348 | 27.3 | 24.3 | 54.8 | 7.16 | | | |

TABLE XI-continued

Example 3 Test Results: Digester B

| | | | Gas Analysis | | | | Liquid Analysis | | |
|---|---|---|---|---|---|---|---|---|---|---|
| | | | Volume Generated | | | | | | | |
| Day | Initial Charge or Amount Replaced | pH Adjustment | Over 24 Hours (mL) | $CO_2$ (%) | $N_2$ (%) | $CH_4$ (%) | pH | COD (mg/L) | $NO_3$ (mg/L) | $NO_2$ (mg/L) |
| 3 | 30Fw + 20S | | 590 | 54.3 | 11.6 | 40.3 | 7.11 | 138700 | 3630 | 250 |
| 4 | 50Fw | 0.2 g peptone | 725 | 52.3 | 8.3 | 43.8 | 6.90 | | | |
| 5 | 50Fw | 1 mL AH | 1000 | 58.9 | 16.5 | 25.1 | 6.67 | | | |
| 6 | 50Fw | 0.1 g AC | 720 | 63.3 | 8.8 | 31.3 | 6.69 | | | |
| 7 | 50Fw | 2.0 mL AH | 525 | 77.4 | 6.1 | 19.1 | 6.45 | 39400 | 550 | 100 |
| 8 | 50Fw | 2.0 mL AH | 340 | 71.6 | 11.8 | 20.0 | 6.46 | | | |
| 9 | No feed | | 325 | 69.1 | 13.7 | 23.0 | 6.64 | | | |
| 1o | 20S + 30SD | | 20 | | | | 6.82 | | | |
| 11 | 20S + 30SD | | 70 | 48.8 | 36.7 | 19.8 | 6.93 | 23120 | 308 | 100 |
| 12 | 25Fw | | 50 | 47.5 | 37.9 | 19.2 | 7.05 | | | |
| 13 | 25Fw | | 210 | 57.6 | 26.5 | 20.0 | 7.04 | | | |
| 14 | 25Fw/o | | 280 | 70.6 | 12.5 | 19.5 | 6.91 | 20600 | 264 | 100 |
| 15 | 25Fw/o | 1.0 mL AH | 380 | 75.6 | 10.4 | 17.3 | 6..91 | | | |
| 16 | 25Fw/o | 0.2 g AC | 325 | 67.2 | 10.7 | 27.8 | 6.91 | | | |
| 17 | 25Fw/o | 2.0 mL AH | 260 | 61.8 | 22.4 | 16.7 | 6.81 | | | |
| 18 | 25Fw/o | 0.5 g peptone + AC | 125 | 44.9 | 30.2 | 26.0 | 7.05 | | | |
| 19 | 25Fw/o | | 175 | 56.5 | 17.3 | 30.9 | 6.86 | 21700 | 220 | 100 |
| 20 | 50Fw/o (1:5 dil.) | | 225 | 58.3 | 142 | 31.1 | 6.99 | | | |
| 21 | 50Fw/o (1:5 dil.) | | 200 | 61.4 | 10.2 | 35.4 | 6.83 | | | |
| 22 | No feed | | 170 | 60.6 | 8.3 | 34.0 | 6.89 | | | |
| 23 | 50Fw/o (1:5 dil.) | 0.5 g YE | 12 | | | | 6.89 | | | |
| 24 | 50Fw/o (1:5 dil.) | | 150 | 43.7 | 22.5 | 43.2 | 6.94 | | | |
| 25 | 50Fw/o (1:5 dil.) | | 142 | 46.4 | 19.2 | 41.5 | 6.95 | 18700 | 110 | 0 |
| 26 | 50Fw/o (1:5 dil.) | 2 mL AH + 0.5 g YE | 145 | 44.4 | 14.8 | 48.7 | 6.88 | 17680 | 110 | 0 |
| 27 | 50Fw/o (1:5 dil.) | | 130 | 35.2 | 22.7 | 49.1 | 7.21 | 17140 | | |
| 28 | 50Fw/o (1:5 dil.) | 1 mL AH | 140 | | | | 6.95 | 17060 | | |
| 29 | No feed | | | | | | | | | |
| 30 | No feed | | | | | | | | | |
| 31 | 50Fw/o (1:5 dil.) | | 205 | 42.0 | 22.8 | 41.5 | 7.22 | 16280 | | |
| 32 | 50Fw/o (1:5 dil.) | | 80 | 35.7 | 23.2 | 52.6 | 7.18 | 14900 | 88 | 0 |
| 33 | 50Fw/o (1:5 dil.) | | 115 | 29.2 | 25.4 | 56.2 | 7.22 | 14150 | | |
| 34 | 50Fw/o (1:5 dil.) | 1.0 mL AH | 130 | 30.7 | 36.6 | 37.4 | 7.16 | | | |
| 35 | 50Fw/o (1:5 dil.) | 0.5 mL AH | 125 | 34.8 | 25.4 | 46.3 | 7.09 | | | |
| 36 | 50Fw/o (1:5 dil.) | 0.5 g peptone | 118 | 40.5 | 18.8 | 49.0 | 6.98 | 11830 | 88 | 0 |
| 37 | 50Fw/o (1:5 dit.) | 0.5 mL AH | 130 | 29.6 | 20.2 | 59.4 | 7.03 | | | |
| 38 | 50Fw/o (1:5 dil.) | | 120 | 29.1 | 14.8 | 62.7 | 7.24 | 10550 | 88 | 0 |
| 39 | No feed | 0.25 g YE + 10 mL SD | 135 | 33.8 | 17.9 | 55.1 | 6.97 | | | |
| 40 | 50Fw/o (1:5 dil.) | 1.0 mL AH | 14 | | | | 7.01 | | | |
| 41 | 50Fw/o (1:5 dil.) | 0.5 mL AH | 130 | 22.6 | 48.9 | 34.6 | 7.22 | 9720 | 88 | 0 |
| 42 | 50Fw/o (1:5 dil.) | 1.0 mL AH | 126 | 26.1 | 40.3 | 44.5 | 7.19 | | | |
| 43 | 50Fw/o (1:5 dil.) | | 110 | 22.3 | 33.3 | 52.2 | 7.43 | 9840 | 88 | 0 |
| 44 | 50Fw/o (1:5 dil.) | 0.5 mL AH | 125 | 29.1 | 29.2 | 49.7 | 7.24 | 9760 | 88 | 0 |
| 45 | No feed | | 120 | 26.8 | 31.1 | 52.6 | 7.18 | | | |

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

We claim:

1. A process for the single stage denitrification and anaerobic digestion of an aqueous waste stream containing organic materials and nitrate ion of at least about 500 mg/L and having a chemical oxygen demand of at least about 2,000 mg/L, said process comprising incubating said aqueous waste stream with a digestion medium comprising denitrifying bacteria, yeast extract, $NiCl_2$ and additional nutrients selected from the group consisting of water-soluble salts of Fe, Ca, Co, Mo, K, Mg, and P, at a pH of from about 6.0 to about 8.5, in an anaerobic environment, for a period of time sufficient to lower nitrate ion concentration by at least about 80% and to lower chemical oxygen demand by at least about 60%.

2. A process in accordance with claim 1 in which said denitrifying bacteria is a mixture of two or more microbial bacteria selected from the group consisting of Achromobacter spp., Aerobacter spp., Alcaligenes spp., Bacillus spp., Flavobacterium spp., Micrococcus spp., Proteus spp., and Pseudomonas spp.

3. A process in accordance with claim 1 in which said yeast extract constitutes from about 0.01 g/L to about 4 g/L of said waste stream and said digestion medium combined.

4. A process in accordance with claim 1 in which said yeast extract constitutes from about 0.1 g/L to about 0.4 g/L of said waste stream and said digestion medium combined.

5. A process in accordance with claim 1 in which said $NiCl_2$ constitutes from about 0.03 mg/L to about 3 mg/L of said waste stream and said digestion medium combined.

6. A process in accordance with claim 1 in which said $NiCl_2$ constitutes from about 0.3 mg/L to about 0.7 mg/L of said waste stream and said digestion medium combined.

7. A process in accordance with claim 1 in which said digestion medium further comprises ammonium hydroxide.

8. A process in accordance with claim 1 in which said digestion medium further comprises ammonium hydroxide and said pH is from about 7.3 to about 7.5.

9. A process in accordance with claim 1 in which said digestion medium comprises denitrifying bacteria, yeast extract, $NiCl_2$, and water-soluble salts of Fe, Ca, Co, Mo, K, and Mg.

10. A process in accordance with claim 1 in which said digestion medium comprises denitrifying bacteria, yeast extract, $NiCl_2$, $FeCl_3$, $CaCl_2$, $CoCl_2$, $Na_2MoO_4$, $MgSO_4$, and a water-soluble K salt.

11. A process in accordance with claim 10 in which said $FeCl_3$, $CaCl_2$, $CoCl_2$, $Na_2MoO_4$, and said water-soluble K salt each constitute from about 0.03 mg/L to about 3 mg/L of said waste stream and said digestion medium combined.

12. A process in accordance with claim 10 in which said $FeCl_3$, $CaCl_2$, $CoCl_2$, $Na_2MoO_4$, and said water-soluble K salt each constitute from about 0.3 mg/L to about 0.7 mg/L of said waste stream and said digestion medium combined.

13. A process in accordance with claim 10 in which said $MgSO_4$ constitutes from about 2 mg/L to about 50 mg/L of said waste stream and said digestion medium combined.

14. A process in accordance with claim 10 in which said $MgSO_4$ constitutes from about 5 mg/L to about 20 mg/L of said waste stream and said digestion medium combined.

15. A process in accordance with claim 1 in which said aqueous waste stream has a nitrate ion content of at least about 800 mg/L and chemical oxygen demand of at least about 5,000 mg/L.

16. A process in accordance with claim 1 in which said aqueous waste stream has a nitrate ion content of at least about 1,000 mg/L and chemical oxygen demand of at least about 10,000 mg/L.

17. A process in accordance with claim 1 in which said pH is from about 6.8 to about 8.0.

18. A process in accordance with claim 1 in which said pH is from about 6.8 to about 7.3.

19. A process in accordance with claim 1 in which said aqueous waste stream and said digestion medium are maintained at a temperature with the range of about 30° C. to about 50° C.

20. A process in accordance with claim 1 in which said aqueous waste stream and said digestion medium are maintained at a temperature with the range of about 32° C. to about 40° C.

21. A process in accordance with claim 1 in which said aqueous waste stream and said digestion medium are maintained at a temperature with the range of about 33° C. to about 36° C.

22. A process in accordance with claim 1 in which said aqueous waste stream is a spent aqueous stream resulting from hydrolysis of lignocellulosic materials.

23. A process in accordance with claim 1 in which said aqueous waste stream is a spent aqueous waste stream from a food processing plant.

24. A process in accordance with claim 1 in which said aqueous waste stream is a spent aqueous waste stream from a pharmaceutical production process.

25. A process in accordance with claim 1 in which said aqueous waste stream comprises effluent and solid waste from a farm operation.

26. A process in accordance with claim 1 in which said aqueous waste stream comprises high nitrate effluent from a chemical process plant.

* * * * *